(12) United States Patent
Hsu

(10) Patent No.: US 7,936,076 B2
(45) Date of Patent: May 3, 2011

(54) UTILIZATION OF ROTOR KINETIC ENERGY STORAGE FOR HYBRID VEHICLES

(75) Inventor: John S. Hsu, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 772 days.

(21) Appl. No.: 12/009,682

(22) Filed: Jan. 22, 2008

(65) Prior Publication Data

US 2008/0173486 A1 Jul. 24, 2008

Related U.S. Application Data

(60) Provisional application No. 60/885,943, filed on Jan. 22, 2007.

(51) Int. Cl.
*H02K 17/42* (2006.01)
(52) U.S. Cl. ........................................ 290/1 A; 310/114
(58) Field of Classification Search ................... 290/1 A; 310/114
See application file for complete search history.

(56) References Cited

U.S. PATENT DOCUMENTS

| | | | |
|---|---|---|---|
| 5,172,784 A * | 12/1992 | Varela, Jr. | 180/65.245 |
| 6,392,370 B1 * | 5/2002 | Bedini | 318/140 |
| 6,891,301 B1 * | 5/2005 | Hsu | 310/171 |
| 6,977,454 B2 | 12/2005 | Hsu | |
| 7,014,586 B2 * | 3/2006 | Randall | 475/2 |
| 7,105,972 B2 * | 9/2006 | Gallant | 318/400.31 |
| 7,134,180 B2 | 11/2006 | Hsu | |
| 7,268,454 B2 * | 9/2007 | Wise | 310/103 |
| 7,270,203 B2 * | 9/2007 | Hsu | 180/65.285 |
| 7,671,501 B2 * | 3/2010 | Groening | 310/114 |
| 7,741,746 B2 * | 6/2010 | Groening | 310/106 |

FOREIGN PATENT DOCUMENTS

JP 11168852 A * 6/1999

* cited by examiner

*Primary Examiner* — Joseph Waks
(74) *Attorney, Agent, or Firm* — Boyle Fredrickson, S.C.

(57) ABSTRACT

A power system for a motor vehicle having an internal combustion engine, the power system comprises an electric machine (12) further comprising a first excitation source (47), a permanent magnet rotor (28) and a magnetic coupling rotor (26) spaced from the permanent magnet rotor and at least one second excitation source (43), the magnetic coupling rotor (26) also including a flywheel having an inertial mass to store kinetic energy during an initial acceleration to an operating speed; and wherein the first excitation source is electrically connected to the second excitation source for power cycling such that the flywheel rotor (26) exerts torque on the permanent magnet rotor (28) to assist braking and acceleration of the permanent magnet rotor (28) and consequently, the vehicle. An axial gap machine and a radial gap machine are disclosed and methods of the invention are also disclosed.

8 Claims, 1 Drawing Sheet

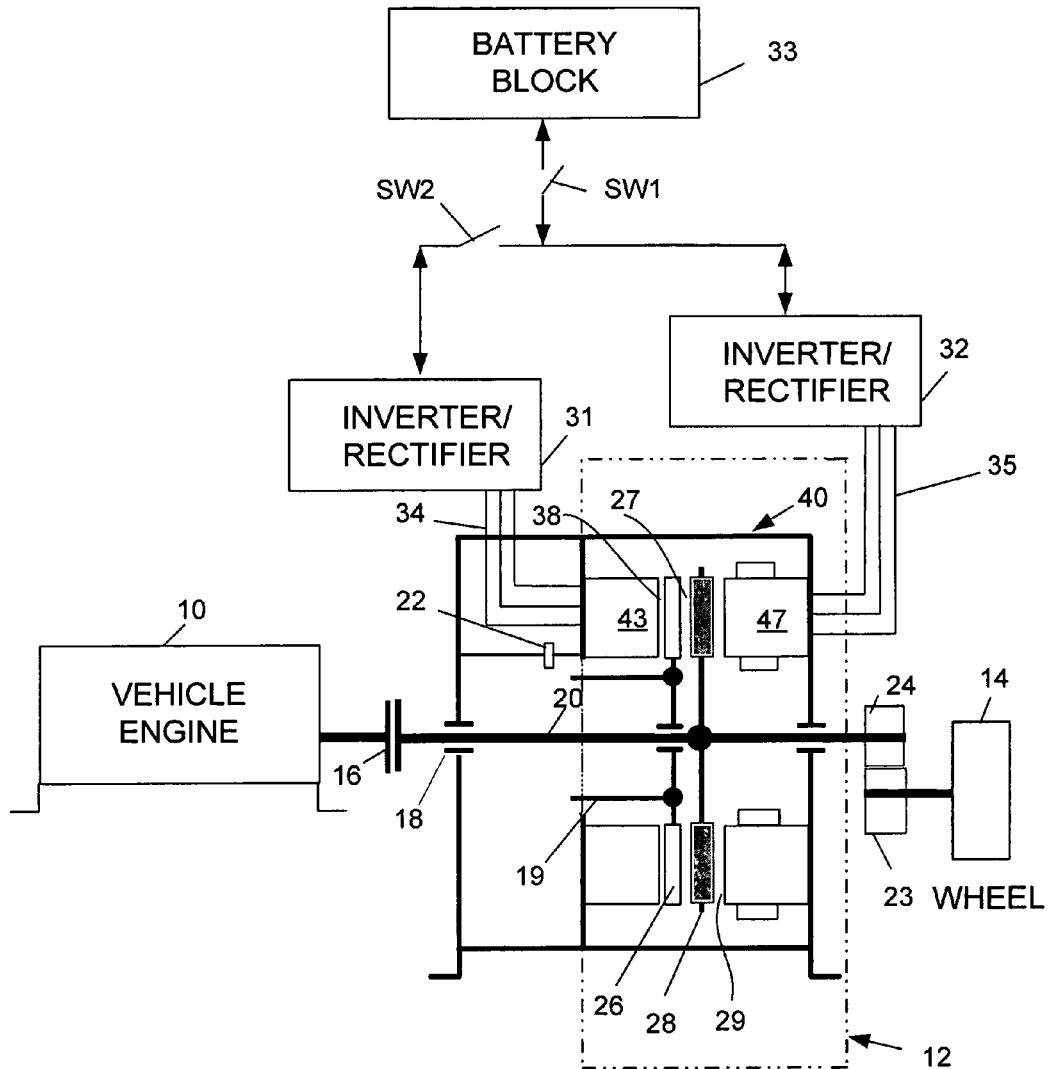

UTILIZATION OF ROTOR KINETIC ENERGY STORAGE FOR HYBRID VEHICLES

CROSS-REFERENCE TO RELATED APPLICATIONS

The benefit of priority based on U.S. Provisional Appl. No. 60/885,943 filed Jan. 22, 2007, is claimed herein.

STATEMENT REGARDING FEDERALLY SPONSORED RESEARCH

This invention was made with United States Government support under Contract No. DE-AC05-00OR22725 between the United States Department of Energy and UT-Battelle, LLC. The United States Government has certain rights in this invention.

FIELD OF THE INVENTION

The field of the invention to electrical motors for hybrid vehicles and more particularly to a dual-rotor axial gap motor with a PM rotor and a second rotor for coupling energy with the PM rotor.

DESCRIPTION OF THE BACKGROUND ART

In hybrid vehicles, energy storage components are known, such as special batteries, ultra capacitors, compressed materials, and flywheels for improving the fuel efficiency. This is particularly important for plug-in vehicles, because the battery has a limited energy capacity; any cost effective approach that can store and reuse the wasted energy must be utilized.

Hsu, U.S. Pat. No. 7,134,180 issued Nov. 14, 2006, describes a dual-rotor axial gap motor with a PM rotor (rotor with permanent magnets) and a second rotor for use in a hybrid vehicle. The second rotor is referred to as an uncluttered rotor because it couples only slip energy with the excitation coils due to the peripherally-oriented excitation coils.

There remains a need to provide a drive system for hybrid vehicles that will accomplish acceleration and braking while saving energy.

SUMMARY OF THE INVENTION

In the present invention, a type of, the dual-rotor motor is provided with an inertial mass flywheel as part of the uncluttered rotor. In a method of the invention, energy stored in the flywheel rotor is recycled to either assist braking or acceleration of the PM rotor.

A secondary excitation source transfers magnetic flux to the uncluttered rotor through the non-salient coupling (i.e., magnetic coupling between two rings is not affected by the rotation of the rings). The other side of the uncluttered rotor that faces a PM rotor that has poles. When power is applied to a stator to drive the PM rotor, magnetic coupling occurs between the PM rotor and the flywheel rotor and torque is created between the PM rotor and the flywheel rotor. As higher speed is reached, kinetic energy is stored in the flywheel rotor. In a braking mode, power is taken away from the PM rotor through the stator which tends to slow the PM rotor and furthermore power is supplied back through the secondary coils to the uncluttered flywheel rotor to accelerate the uncluttered rotor and, at the same time, to pull in a braking direction on the PM rotor which also tends to slow down the PM rotor. With the flywheel rotor operating as significant speed, power can also be fed from the secondary coils back to the stator to provide additional energy to the PM rotor to pull it along.

This invention allows the relatively low power density of the "uncluttered" rotor to act as a component for relatively high frequency energy cycling. This includes, but is not limited to, the slowing down of a vehicle in traffic, and for short distances when traveling up and down hilly roads. The rotor kinetic energy storage can be used without any conflict with other energy storage components. It does not add cost to the drive when the uncluttered rotor is used. The inertia of the vehicle is not increased.

The advantages of the invention include: adding the unique uncluttered rotor kinetic energy storage without extra cost, and without any system conflict between this rotor kinetic energy storage and other known energy storage methods (such as battery, ultra capacitors, etc). In addition, no special housing is required due to lower flywheel power density, vehicle operation inertia is not increased, and higher fuel efficiency is provided due to energy recovery provided by the uncluttered rotor.

Although the preferred embodiment herein is shown as an axial gap motor, radial gap embodiments are also available in which the invention can be employed.

The invention is also applicable to an electric vehicle not having an internal combustion engine.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention.

BRIEF DESCRIPTION OF THE DRAWING

The drawing is a schematic of an electric drive system for a hybrid vehicle which incorporates the method and apparatus of the present invention.

DETAILED DESCRIPTION

The drawing illustrates a continuous, variable transmission (CVT) for a hybrid vehicle, particularly, a plug-in hybrid vehicle. An internal combustion engine 10 is coupled to the wheels 14 through a clutch 16, a drive shaft 20 and gears, 23, 24. The shaft 16 is supported at various points by suitable bearings including bearings 18.

The electric machine 12 is a permanent magnet (PM) ac induction machine which has been previously disclosed in Hsu, U.S. Pat. Nos. 6,977,454 and 7,134,180. This machine 12 has a housing 40 for supporting a first excitation source 47, a stator with multi-phase windings, and a secondary excitation source 43. The stator 47 receives multi-phase electric power through lines 35 from an inverter/rectifier 32. The machine 12 also includes a first, PM rotor 28 carrying permanent magnets (PMs), which is positioned next to the stator 47 and faces a second uncluttered, flywheel rotor 26. This rotor is uncluttered because it couples only slip energy and not rotational energy from the excitation source 43. The flywheel rotor 26 in turn has a secondary excitation source 43 disposed in the housing 40 on its opposite side with peripherally disposed windings which encircle the main drive shaft 20. The PM rotor 38 is mounted for rotation with the main drive shaft 20. A first air gap 29 that extends axially in relation to an axis of rotation for the main drive shaft 20 is located between the stator 47 and the PM rotor 28. A second axial air gap 27 is provided between the PM rotor 28 and the uncluttered rotor 26. And, a third axial air gap 38 is provided between the first rotor 26 and the secondary excitation source 43.

A battery block 33 is connected to a first inverter/rectifier 31 to supply power to, and to be charged from, the secondary excitation source 43. The battery block 33 is also connected to an inverter/rectifier 32 to supply power to, and to be charged from, the stator 47. The battery block 33 can supply power to the excitation sources 43, 47 on either side of the air gap region and can receive power from the excitation sources 43, 47 on either side of the air gap region. The battery block 33 includes a battery, and optionally a boost converter and an ultra capacitor of a type known in this art.

Speed sensors (not shown) are also provided for sensing the speed of the internal combustion engine 10 and the wheels 14. These speed signals are sent to a controller (not shown), which has the ability under certain conditions to move pin 22 into and out of engagement with a fixed member 19 to hold the uncluttered rotor 26 stationary.

The secondary excitation source 43 includes toroidal cores and coils wound in a peripheral or circumferential direction. This secondary excitation source 43 operates to transfer magnetic flux to the flywheel rotor 26 through the non-salient coupling (i.e., magnetic coupling between two rings is not affected by the rotation of the rings). The other side of the flywheel rotor 26 that faces the PM rotor 28 has saliency. This means that the torque can be created between the PM rotor 28 and the flywheel rotor 26 at this side of the rotor. There are no slip rings and brushes for producing the torque between the flywheel rotor 26 and the PM rotor 28. The higher-inertia flywheel rotor 26 is not mechanically attached to the PM rotor 28. Consequently, during acceleration of the vehicle, the flywheel rotor 26 does not slow down the acceleration of the PM rotor 28 that is coupled to the wheels 14 through gears 23, 24. As optional arrangements the flywheel rotor 26 can be locked, pinned, or unit-directionally ratcheted to hold the flywheel rotor 26 stationary when the wheels 14 need to be driven in high power by both sides (i.e., from both the PM armature and the secondary excitation source). However, even without the optional arrangements the drive 12 can still operate with only the flywheel rotor running backwards.

The kinetic energy cycling is explained as follows. During braking of the vehicle the stator 47 is operated as a generator, and the generated energy is used to accelerate the flywheel rotor 26 through the secondary excitation source 43. The torque between the flywheel rotor 26 and the PM rotor 28 operates to slow down the PM rotor 28. This helps the braking requirement. If without the optional arrangement the flywheel rotor is rotating in the reversed direction, it can run as a generator for braking purposes. When the kinetic energy stored in the flywheel rotor is needed to accelerate the PM rotor and the flywheel rotor 26 is rotating faster than the PM rotor 28 in the forward direction, the flywheel rotor 26 runs as a generator, and the power produced through the secondary excitation source 43 is fed to the first excitation source 47 for accelerating the PM rotor 28. The torque generated between the flywheel rotor and the PM rotor 28 operates to accelerate the PM rotor 28 in this mode of operation.

The optional on/off switches SW1 and SW2 shown in the drawing provide the following capabilities for further improvements. When switch 1 is closed or on, the DC bus voltage for both the inverters 31, 32 (of the stator winding of the PM rotor and the toroidal winding of the flywheel rotor) is at the voltage level of the battery block 33. When switch SW1 is off or opened, the battery block voltage is isolated from the inverters 31, 32, and the windings can be operated at a lower voltage level directly. When the switch SW2 is off, the secondary excitation source 43 can be short-circuited for an induction-mode type of operation.

In one detailed embodiment, the flywheel rotor 26 was designed with a core provided by a silicon steel ring having an outer diameter of 0.25 m and an inner diameter of 0.15 m and a thickness along its axis of 0.1 m. The flywheel has a weight of 25 kg and an operating speed of 12,000 rpm. This would provide 410,000 Joules of energy or 100 kW for 4.1 seconds.

Although, the invention has been described above in terms of an axial gap embodiment, it is also possible to provide a radial gap embodiment, in which the uncluttered flywheel rotor and the PM rotor are cylindrical members rotating around an inner excitation core and within an outer cylindrical stator. The PM rotor can be positioned either to the inside or to the outside of the uncluttered flywheel rotor.

This has been a description of an example of the preferred embodiments of the invention. The present invention is intended to encompass a range of embodiments including modifications to the details described above which would be apparent to one of ordinary skill in the art. To more particularly point out and distinctly claim the invention, the following claims are provided.

I claim:

1. A power system for a motor vehicle having an internal combustion engine, the power system comprising:
    an electric machine comprising:
    a first excitation source having coils for receiving ac electrical power to provide a magnetic field;
    a permanent magnet rotor spaced from the stator to define a first air gap relative to the permanent magnet rotor;
    a magnetic coupling rotor spaced from the permanent magnet rotor to define a second air gap relative to the permanent magnet rotor; and
    at least one secondary excitation source spaced from the magnetic coupling rotor by a third air gap to provide slip-energy excitation to the magnetic coupling rotor; and
    wherein the magnetic coupling rotor also includes a flywheel having an inertial mass to store kinetic energy during an initial acceleration of the permanent magnet rotor to an operating speed; and
    wherein the first excitation source is electrically connected to the second excitation source for power cycling such that the flywheel rotor exerts torque on the permanent magnet rotor to assist braking and acceleration of the permanent magnet rotor.

2. The power system of claim 1, wherein power can be returned from the first excitation source to the second excitation source to accelerate the magnetic coupling rotor, and to speed up or slow down the permanent magnet rotor.

3. The power system of claim 1, wherein the second excitation source can used stored energy in the flywheel to operate as a generator to supply power to the permanent magnet rotor for acceleration.

4. The power system of claim 1, wherein the electric machine provides an axial air gap between the permanent magnet rotor and the slip-energy magnetic coupling rotor.

5. The power system of claim 1, further comprising switches for controlling the electrical connection of the first excitation source, the second excitation source and a battery for providing additional modes of operation.

6. A method for improving efficiency in a hybrid vehicle, comprising:
    accelerating a permanent rotor from a first excitation source providing multiphase excitation;
    providing slip energy excitation to a flywheel rotor from a second excitation source;

storing kinetic energy in a flywheel rotor during acceleration of the permanent magnet rotor in which there is magnetic coupling between the flywheel rotor and the permanent magnet rotor; and operating the first excitation source and the permanent magnet rotor as a generator and returning power through the second excitation source to the flywheel rotor to slow down the permanent magnet rotor.

7. The method of claim 6, wherein the flywheel rotor stores kinetic energy during an initial acceleration to an operating speed and thereafter, through power cycling between the first excitation source and the second excitation source, the flywheel rotor exerts torque on the permanent magnet rotor to provide at least one of a braking mode of operation and an acceleration mode of operation for the permanent magnet rotor.

8. The method of claim 6, wherein the method is practiced in an electric vehicle that does not include an internal combustion engine.

* * * * *